United States Patent [19]

Suzuki et al.

[11] Patent Number: 4,844,586
[45] Date of Patent: Jul. 4, 1989

[54] ADJUSTMENT APPARATUS FOR A LENS BARREL WITH BUILT-IN MOTOR

[75] Inventors: Ryuji Suzuki, Kanagawa; Hiroshi Furukawa; Shigeru Kamata, both of Tokyo, all of Japan

[73] Assignee: Canon Kabushiki Kaisha, Tokyo, Japan

[21] Appl. No.: 138,968

[22] Filed: Dec. 29, 1987

[30] Foreign Application Priority Data

Jan. 6, 1987 [JP] Japan .................. 62-000704[U]

[51] Int. Cl.[4] .......................... G02B 7/10; G03B 3/00
[52] U.S. Cl. .................................. 350/255; 350/247; 350/429; 354/195.1
[58] Field of Search ............ 350/247, 255, 429; 354/195.1, 195.11, 195.12, 195.13

[56] References Cited

U.S. PATENT DOCUMENTS

| | | | |
|---|---|---|---|
| 4,000,501 | 12/1976 | Sakaguchi et al. | 350/429 |
| 4,322,151 | 3/1982 | Weiss | 350/429 |
| 4,380,378 | 4/1983 | Tamura | 350/429 |
| 4,386,829 | 6/1983 | Sumi | 350/429 |
| 4,390,260 | 6/1983 | Prinz | 354/195.1 |
| 4,484,800 | 11/1984 | Tamura | 350/429 |
| 4,639,083 | 1/1987 | Fuziwara et al. | 350/255 |
| 4,688,902 | 8/1987 | Gardam | 350/429 |
| 4,690,514 | 9/1987 | Kamata et al. | 350/429 |
| 4,730,901 | 3/1988 | Suzuki et al. | 350/255 |

FOREIGN PATENT DOCUMENTS

| | | | |
|---|---|---|---|
| 59-87413 | 5/1984 | Japan | 350/247 |
| 59-87414 | 5/1984 | Japan | 350/247 |

*Primary Examiner*—Bruce Y. Arnold
*Assistant Examiner*—Martin Lerner
*Attorney, Agent, or Firm*—Fitzpatrick, Cella, Harper & Scinto

[57] ABSTRACT

Adjustment apparatus for a lens barrel comprises a built-in driving motor; an output gear which is arranged with have its rotation shaft parallel to the optical axis of the lens barrel and to transmit the rotation of the driving motor; a lens driving device which has a transmission gear engaging the output gear and is arranged to shift the lens of the lens barrel in the optical axis direction by using the rotation of the driving motor as a drive source; and an adjustment cam ring which has a tapered cam part and is rotatable around the optical axis. The tapered cam part abuts on the rotation shaft of the output gear. Back-lash adjustment between the output gear and the transmission gear can be accomplished by moving the position of the output gear by rotating the cam ring around the optical axis.

9 Claims, 2 Drawing Sheets

ADJUSTMENT APPARATUS FOR A LENS BARREL WITH BUILT-IN MOTOR

BACKGROUND OF THE INVENTION:

1. Field of the Invention:

This invention relates to back-lash adjustment for a lens barrel incorporating a driving motor which is adapted for automatic focusing or the like.

2. Description of the Related Art:

The motor output gear and the large focusing gear of a lens barrel of the kind incorporating a driving motor for automatic focusing, etc. has heretofore been arranged either to permit no back-lash adjustment or to permit back-lash adjustment between the motor output gear and the large gear which is provided for focusing. In the latter case, a hole provided for mounting a motor gear head unit on which the motor output gear is mounted has been loosely arranged to permit the back-lash adjustment by slightly shifting the mounting position of the unit during assembly work.

This method, however, hardly permits fine adjustment. Another problem resides in that it does not allow adjustment after completion of the assembly work.

SUMMARY OF THE INVENTION

It is an object of this invention to provide a lens barrel which has a built-in motor and is arranged to permit not only continuous fine back-lash adjustment but also back-lash adjustment from outside of the lens barrel after completion of assembly work.

The above and further objects and features of this invention will become apparent from the following detailed description of a preferred embodiment thereof taken in connection with the accompanying drawings.

DETAILED DESCRIPTION OF PREFERRED EMBODIMENT

Figure 1:
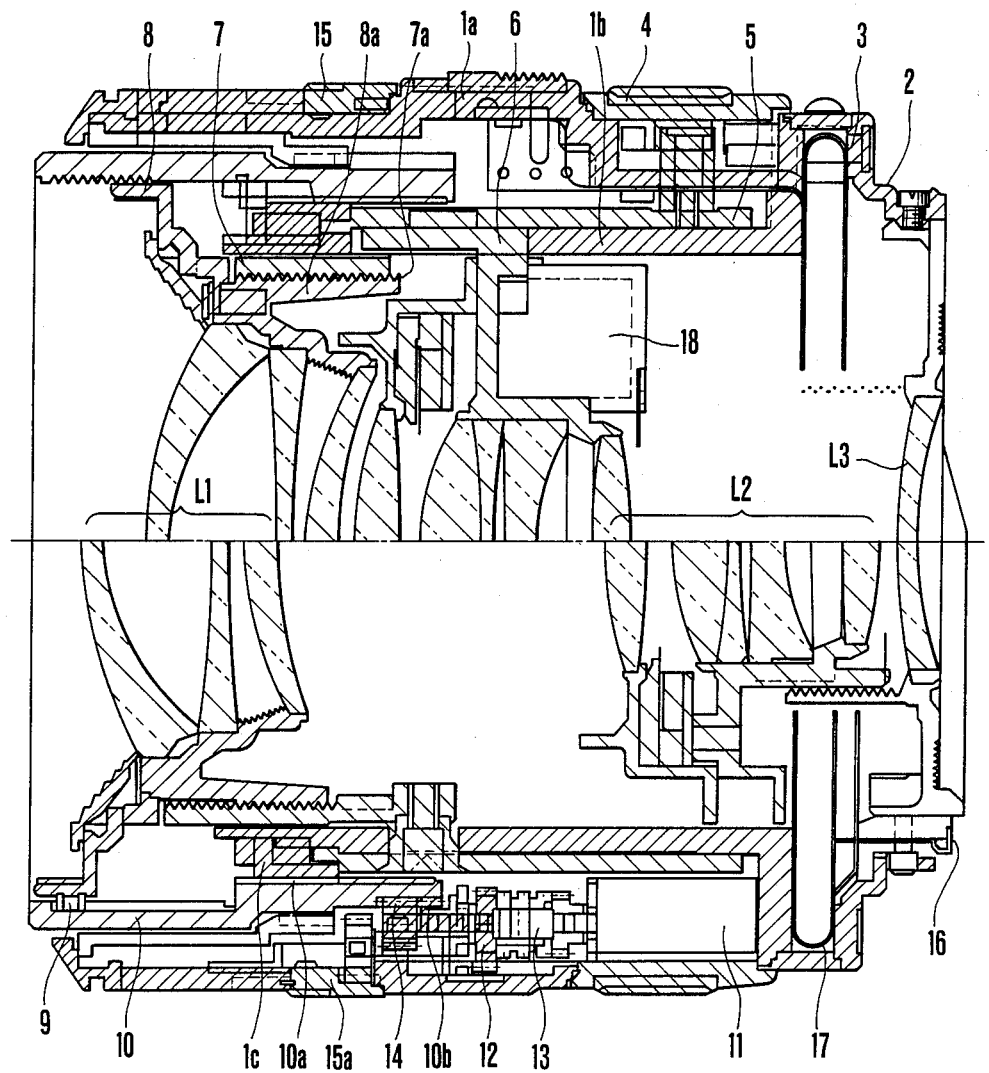
FIG. 1 is a sectional view showing a lens barrel which incorporates a motor therein and is arranged as a preferred embodiment of this invention.
Figure 2:
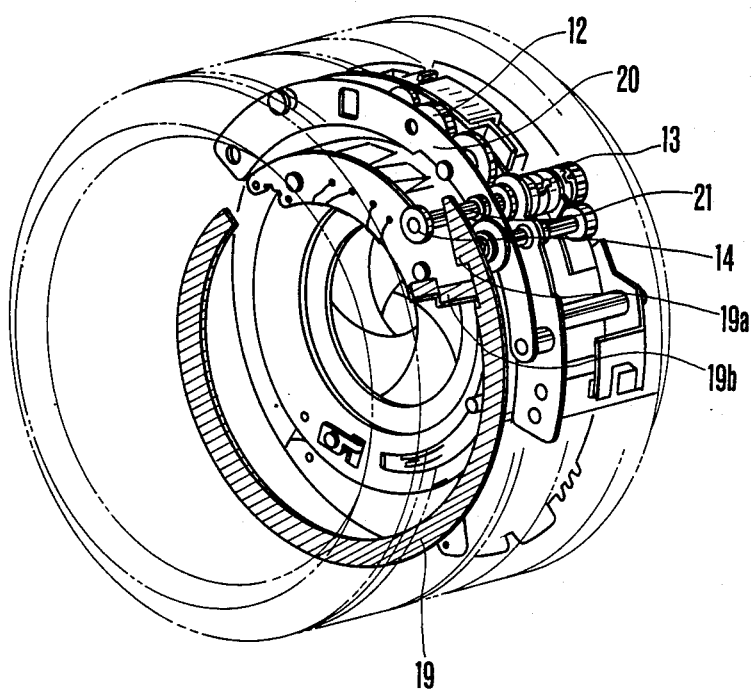
FIG. 2 is an oblique view showing the essential parts of a back-lash adjustment device arranged according to this invention.

FIGS. 1 and 2 show an embodiment of this invention. FIG. 1 is a sectional view showing a lens barrel to which this invention is applied. A fixed outer tube 1a has a metal mount 2 secured by means of screws 3 to the rear end part thereof. The metal mount 2 is arranged to be used for mounting the lens barrel on a camera body which is not shown. A fixed inner tube 1b is coupled with the outer tube 1a via a flange part. A zoom operation member 4 is connected to a cam tube 5 which is rotatably fitted on the outside of the fixed inner tube 1b. A frame 6 which is carrying a rear lens group L2 is carried by the inner side of the fixed inner tube 1b in such a way as to be straightly movable. A moving ring 7 which is arranged to move a front lens group L1 is carried also by the inner side of the fixed inner tube 1b in such a way as to be straightly movable. On the inner side of the moving ring 7 is provided a helicoid part 7a, which is in screwed engagement with the helicoid part 8a of a front lens group carrying frame 8. A rotation transmitting pin 9 is arranged at the fore end of the front lens group carrying frame 8 to transmit the rotation of a rotary helicoid tube 10. A helicoid part 10a which is provided along the inner circumferential part of the rotary helicoid tube 10 and is in screwed engagement with a helicoid part 1c provided along the outer circumference of the fixed inner tube 1b. A large gear part 10b for focusing is provided along the outer circumference of the rotary helicoid tube 10. The large gear part 10b engages an output gear 14 which is arranged to be rotated by a focusing driving motor 11 via a reduction gear train 12 and a manual-automatic focusing change-over clutch 13. A manual focusing operation member 15 is provided on the outside of the fixed outer tube 1a. The member 15 is provided with a gear part 15a which is arranged on the inner circumferential part thereof to engage a part of the reduction gear train 12. A signal contact 16 is arranged to supply power from a power supply terminal disposed on the camera body via a flexible printed circuit board 17 to the automatic focusing driving motor 11 and to a diaphragm unit 18 which is arranged to be electro-magnetically driven.

With this lens barrel mounted on the camera body which is not shown, when the zoom operation member 4 is turned round, the cam tube 5 rotates to cause, through a known mechanical device, the frame 6 carrying the rear lens group L2 to move backward and the moving ring 7 to move forward at the same time. This causes the front lens group carrying frame 8 which is in screwed engagement with the ring 7 to move also forward. The lens barrel thus changes from a tele-photo state as shown in the upper half of FIG. 1 over to a wide-angle photographing state as shown in the lower half of FIG. 1. After that, when a shutter release button is pushed to its first step stroke position, a distance measuring circuit which is disposed within the camera body supplies a focusing driving signal to the automatic focusing driving motor 11 via the signal contact 16 and the flexible printed circuit board 17. The rotation of the motor 11 is transmitted to the output gear 14 via the reduction gear train 12 and the change-over clutch 13. The rotation of the output gear 14 is transmitted to the gear part 10b of the rotary helicoid tube 10 which engages the gear 14. This causes the rotary helicoid tube 10 to be drawn out forward to an extent corresponding to the lead of the helicoid part 10a of the tube 10. The rotation of the rotary helicoid tube 10 is transmitted by the rotation transmitting pin 9 to the front lens group carrying frame 8. Then, the front lens group carrying frame 8 is drawn forward to an extent as much as the lead of the helicoid part 8. When the front lens group L1 reaches an in-focus position, a focusing driving halt signal is produced from the camera body side to bring the automatic focusing driving motor 11 to a halt. At the same time, a light display is made to indicate completion of a focusing action within a view finder disposed on the side of the camera body. Following this display, when the release button is further pushed, the camera body side generates a diaphragm driving signal which has been computed. This signal is then transmitted via the signal contact 16 and the flexible printed circuit board 17 to the diaphragm unit 18. The aperture of the diaphragm 18 is then stopped down to a preset aperture value position. At the same time, a mirror disposed within the camera body is uplifted. Upon completion of the mirror lifting action, shutter screens travel to effect an exposure.

FIG. 2 shows in an oblique view the essential parts of a back-lash adjustment device arranged according to this invention. A cam ring 19 is indicated in FIG. 2 with hatching. The cam ring 19 has a C-shaped body part with tapered cam part 19a and a bent part 19b located at the fore end part of the cam ring 19. The cam ring 19 is rotatably carried by a groove formed along the inner circumference of the fixed outer tube 1a. The motor gear head unit has a base plate 20. The above stated automatic focusing driving motor 11, the reduction gear train 12, the change-over clutch 13 and the output gear 14 are assembled together on the base plate 20. A collar 21 is fitted on the rotation shaft of the output gear 14. The bottom part of the collar 21 is secured by caulking to the motor gear head unit base plate 20. Meanwhile, the whole motor gear head unit is screwed via a rubber bush to the body of the lens barrel. The position of the unit is thus arranged to be shiftable to a slight degree. As viewed from the front after completion of assembly work, the bent part 19b of the adjustment cam ring 19 is partly exposed to the inside of the fixed outer tube 1a. Therefore, the position of the whole motor gear head unit is shiftable inward to a small extent by moving the exposed bent part 19b with a screw driver or the like in the circumferential direction in such a way as to push the tapered cam part 19a of the fore end of the cam ring 19 radially toward the optical axis. In this manner, back-lash adjustment can be accomplished for the output gear 14 and the focusing large gear 10b provided on the outer circumference of the rotary helicoid tube 10b.

With the adjustment cam ring which has the tapered cam part at its fore end arranged along the inner circumference of the fixed lens barrel part as mentioned above, the degree of back-lash between the output gear and the focusing large gear not only can be continuously and finely adjusted during assembly work but also can be adjusted from outside without difficulty even after the lens barrel is completely assembled.

While this invention is applied to back-lash adjustment between the focusing large gear and the output gear of the focusing motor in the case of the embodiment described, the invented arrangement of the adjustment cam ring is of course advantageously applicable also to back-lash adjustment between the output gear of a zooming motor and a zooming gear disposed within a zoom lens barrel.

What is claimed is:

1. Adjustment apparatus for a lens barrel having a built-in driving motor, comprising:
   output gear means arranged to be driven by said driving motor, a rotation shaft of said output gear means being disposed in parallel with the optical axis of said lens barrel;
   a lens driving device having a transmission gear which engages said output gear means, said lens driving device being arranged to shift the lens in the direction of the optical axis using said driving motor as a drive source; and
   an adjustment cam ring which has a tapered cam part and is arranged to be rotatable around the optical axis, said tapered cam part being arranged to abut the rotation shaft of said output gear, rotation of said cam ring causing relative movement between said output gear means and said transmission gear.

2. Apparatus according to claim 1, further comprising a speed reducing transmission system for transmitting a rotation of said driving motor to said output gear means.

3. Apparatus according to claim 2, wherein the driving motor, said speed reduction transmission system and said output gear are formed in a unitized structure.

4. Apparatus according to claim 3, wherein said transmission gear comprises a tubular gear having a gear part which is formed along the inner circumference thereof and is arranged to engage said output gear means.

5. Apparatus according to claim 4, further comprising a fixed outer tube which serves as a shell, and a fixed inner tube which is arranged on the inner side of said outer tube with a clearance left in the radial direction thereof, and wherein the unitized driving motor, speed reducing transmission system, and output gear means are interposed in between said fixed outer tube and said fixed inner tube; and wherein said tubular gear has at least said gear part thereof disposed in between said fixed outer tube and said fixed inner tube.

6. Apparatus according to claim 1, wherein said lens driving device is arranged to perform focus control.

7. Apparatus according to claim 1, further comprising an operation member coupled to said adjustment cam ring and extending in a direction parallel with the optical axis.

8. Adjustment apparatus for lens barrel having built-in driving means, comprising:
   (a) said driving means including a driving motor, a speed reducing transmission system, and an output gear;
   (b) lens driving means having a transmission gear which engages said output gear, said lens driving means being arranged to shift the lens in the direction of the optical axis using the rotation of said driving motor as a drive source; and
   (c) an adjustment cam ring which is arranged to have a tapered cam part and is rotatable around the optical axis, said tapered cam part of said cam ring being arranged to abut said driving motor, rotation of said cam ring causing relative movement between said output gear and said transmission gear.

9. Apparatus according to claim 8, further comprising an operation member coupled to said adjustment cam ring and extending in a direction parallel with the optical axis.

* * * * *